(12) United States Patent
Oommen

(10) Patent No.: US 7,937,083 B2
(45) Date of Patent: May 3, 2011

(54) METHOD, APPARATUS AND COMPUTER PROGRAM PROVIDING FOR RAPID NETWORK SELECTION IN A MULTIMODE DEVICE

(75) Inventor: Paul Oommen, Irving, TX (US)

(73) Assignee: Nokia Corporation, Espoo (FI)

( * ) Notice: Subject to any disclaimer, the term of this patent is extended or adjusted under 35 U.S.C. 154(b) by 630 days.

(21) Appl. No.: 11/107,495

(22) Filed: Apr. 14, 2005

(65) Prior Publication Data

US 2006/0234705 A1    Oct. 19, 2006

(51) Int. Cl.
*H04W 4/00*    (2009.01)

(52) U.S. Cl. ............ 455/432.3; 455/435.2; 455/435.3; 455/432.1

(58) Field of Classification Search .............. 455/422.1, 455/432.1, 432.3, 435.2, 435.3
See application file for complete search history.

(56) References Cited

U.S. PATENT DOCUMENTS

| | | | | |
|---|---|---|---|---|
| 5,442,806 A | 8/1995 | Barber et al. | ................ | 455/33.1 |
| 5,754,542 A | 5/1998 | Ault et al. | ...................... | 370/342 |
| 5,903,382 A | 5/1999 | Tench et al. | .................... | 359/265 |
| 5,903,832 A | 5/1999 | Seppanen et al. | ............ | 455/414 |
| 5,915,214 A | 6/1999 | Reece et al. | .................. | 455/406 |
| 6,119,003 A | 9/2000 | Kukkohovi | .................... | 455/435 |
| 6,208,857 B1 | 3/2001 | Agre et al. | .................... | 455/428 |
| 6,438,369 B1 | 8/2002 | Huang et al. | ................... | 455/417 |
| 6,625,451 B1 * | 9/2003 | La Medica et al. | ........... | 455/434 |
| 6,684,082 B1 | 1/2004 | McClure | ..................... | 455/552.1 |
| 6,728,536 B1 * | 4/2004 | Basilier et al. | ............. | 455/432.1 |
| 6,748,217 B1 | 6/2004 | Hunzinger et al. | ........ | 455/435.2 |
| 6,751,460 B2 | 6/2004 | Korpela et al. | ............... | 455/449 |
| 6,766,169 B2 * | 7/2004 | Cooper | ...................... | 455/435.2 |
| 6,873,836 B1 | 3/2005 | Sorrells et al. | ................ | 455/313 |
| 6,934,544 B2 | 8/2005 | Cooper et al. | ............. | 455/435.2 |
| 6,978,142 B2 | 12/2005 | Jokimies | ....................... | 455/449 |
| 7,069,026 B2 | 6/2006 | McClure | ................... | 455/456.3 |
| 7,072,651 B2 * | 7/2006 | Jiang et al. | ................. | 455/432.1 |
| 7,120,436 B2 * | 10/2006 | Kim | ............................. | 455/433 |
| 7,167,707 B1 * | 1/2007 | Gazzard et al. | ............... | 455/434 |
| 7,277,705 B2 * | 10/2007 | Casaccia et al. | ........... | 455/435.1 |
| 7,313,398 B1 | 12/2007 | Ramahi | ........................ | 455/436 |
| 2002/0087674 A1 | 7/2002 | Guilford et al. | .............. | 709/223 |
| 2003/0017842 A1 | 1/2003 | Moles et al. | .................. | 455/552 |

(Continued)

FOREIGN PATENT DOCUMENTS

EP    0 781 064 A2    6/1997

(Continued)

OTHER PUBLICATIONS

"TR for Network Selection Principles v.0.2.0", Paul Carpenter, TSG-SA WGI #28, XP-002579978, Apr. 2005, 16 pgs.

(Continued)

*Primary Examiner* — Un C Cho
(74) *Attorney, Agent, or Firm* — Harrington & Smith

(57) ABSTRACT

A mobile station includes at least one radio frequency transceiver, a data processor and a memory coupled to the data processor. The memory stores information that includes an overlay function and overlay parameters for use by the data processor to perform system selection by invoking the overlay function to determine if the overlay parameters specify that a home system is to be acquired and, if so, to initiate a scan using the transceiver to attempt to acquire the home system using home system-related overlay parameters, else attempting to acquire a non-home system.

75 Claims, 6 Drawing Sheets

U.S. PATENT DOCUMENTS

| | | | |
|---|---|---|---|
| 2003/0134637 A1* | 7/2003 | Cooper | 455/432 |
| 2003/0148774 A1 | 8/2003 | Naghian et al. | 455/456 |
| 2004/0148352 A1* | 7/2004 | Menon et al. | 709/205 |
| 2004/0224689 A1 | 11/2004 | Raghuram et al. | 455/435.3 |
| 2004/0235475 A1 | 11/2004 | Ishii | 455/435.3 |
| 2005/0037755 A1 | 2/2005 | Hind et al. | 455/435.3 |
| 2005/0083899 A1 | 4/2005 | Babbar et al. | 370/342 |
| 2005/0227688 A1 | 10/2005 | Li et al. | 455/432.1 |
| 2005/0227692 A1* | 10/2005 | Kawashima et al. | 455/435.2 |
| 2006/0234705 A1 | 10/2006 | Oommen | 455/435.3 |
| 2006/0282554 A1 | 12/2006 | Jiang et al. | 710/14 |
| 2007/0019575 A1 | 1/2007 | Shaheen | 370/310 |

FOREIGN PATENT DOCUMENTS

| | | |
|---|---|---|
| EP | 0 980 190 A1 | 2/2000 |
| EP | 1 246 499 A1 | 10/2002 |
| EP | 1 519 615 A2 | 3/2005 |
| WO | WO-97/30561 A1 | 8/1997 |
| WO | WO 03/067918 A1 | 8/2003 |
| WO | WO-03/100647 A1 | 12/2003 |
| WO | WO 2005/117463 A2 | 12/2005 |
| WO | WO 2005/117468 A1 | 12/2005 |
| WO | WO 2005/122601 A2 | 12/2005 |

OTHER PUBLICATIONS

"Over-the-Air Service Provisioning of Mobile Stations in Spread Spectrum Standards", 3GPP2 C.S0016-B, Version 1.0, Sections 3.3.5, 3.5.5 and Annex C, Oct. 25, 2002, 34 pgs.

"Over-the-Air Service Provisioning of Mobile Stations in Spread Spectrum Standards Release C", 3GPP2 C.S0016-C, Version 1.0, Sections 3.3.5, 3.5.5 and Annex C, Oct. 22, 2004, 34 pgs.

Rohini, P. P., "Over-The-Air Provisioning in CDMA", Gemplus Technologies, Oct. 2004.

3GPP2 C.S0064-0, $3^{rd}$ Generation Partnership Project 2, "IP Based Over-the-Air Device Management (IOTA_DM) for cdma2000 Systems", Release 0, Version 1.0, Sep. 6, 2005.

3GPP TS 25.304, V7.1.0, $3^{rd}$ Generation Partnership Project; "Technical Specification Group Radio Access Network; User Equipment (UE) procedures in idle mode and procedures for cell reselection in connected mode", (Release 7) (Dec. 2006).

3GPP TS 45.008, V7.6.0, $3^{rd}$ Generation Partnership Project; "Technical Specification Group GSM/EDGE Radio Access Network; Radio subsystem link control", (Release 7) (Nov. 2006).

3GPP TSG-CN Meeting #23, Phoenix USA, Mar. 10-12, 2004, "Use of the Radio Access Technology (RAT) during background scanning", XP-002485679, Tdoc NP-040098, Source: $O_2$, T-Mobile, Orange . . . , Agenda item: 9.22.

3GPP TSG-CN Meeting #23, Phoenix, USA, Mar. 10-12, 2004, "Issues relating to use of radio access technology (RAT) in the periodic PLMN scan", XP-002485680, NP-040116, Source: Motorola, Agenda item: 9.22.

* cited by examiner

| OVERLAY MODE | STATUS (ENABLE/DISABLE) |
|---|---|
| MANUAL | |
| AUTOMATIC (WITH INITIAL HOME SYSTEM SELECTION) | |
| AUTOMATIC (WITH INITIAL SELECTION OF ANY HIGHER PRIORITY SYSTEM) | |
| RESELECTION (RESELECTION FOR HOME SYSTEM) | |
| RESELECTION (FOR ANY HIGHER PRIORITY SYSTEM) | |
| HOME NETWORK SELECTION | |
| SERVICE BASED | |

METHOD, APPARATUS AND COMPUTER PROGRAM PROVIDING FOR RAPID NETWORK SELECTION IN A MULTIMODE DEVICE

TECHNICAL FIELD

The embodiments of this invention relate generally to wireless communications devices and networks and, more specifically, relate to multimode system selection methods and apparatus wherein, as a non-limiting example, a cdma2000 system may be one of the systems that may be selected.

BACKGROUND

A conventional approach to multimode system selection uses only a system preference. As examples, the preference may be for various systems of CDMA and GSM families. However, this conventional system selection approach leads to the problem of the MS attempting to select a preferred (higher priority) system in another network in geographic areas where a system of the home network is present. As a general rule, it may be required that the MS attempt to find the home network and to acquire the home network.

What is needed therefore is a multimode system selection technique that permits different modes of operation to provide a solution to the problem of the MS attempting to register to a non-home network when the home network is available in a given geographic region.

Examples of conventional system selection approaches can be found in commonly assigned U.S. Pat. No. 5,903,832, "Mobile Terminal Having Enhanced System Selection Capability", by Jorma Seppanen, Juha Vaihoja, Mikko Lietsalmi and Jaacko Vantilla, and in U.S. Pat. No. 6,684,082 B1, "Adaptive System Selection Database", by Kenneth McClure.

The first referenced U.S. patent describes a mobile station that maintains a single, prioritized list of all available networks (all public, residential, and private networks). Access to the various networks is then based on the user's needs. A first type of access is an automatic access, that requires little or no user involvement. A second type of access is to a user-specified network. A third type of access is to a user-specified service (e.g., data, fax, e-mail, etc.) that is supported by at least one of the networks. The mobile station can search for additional networks, and can also search for additional networks that support only a specified type of service, or for a network that supports a service not supported by networks that are already in the list. All of the networks can be searched at once so that the user can readily make a selection from the single, prioritized network list. The network priorities are user programmable by moving network names up and down in the list using a mobile station user interface, such as the mobile station's keypad. The higher the network name is placed in the list, the higher is the priority of the network.

The second above-referenced commonly assigned U.S. patent describes a method to operate a mobile station that includes storing data into a memory within the mobile station, where the stored data includes at least one system operator code (SOC) having an assigned priority value. Upon the mobile station receiving a system identification (SID) associated with the stored SOC, the method stores the SID into the memory so as to have the same priority value that is assigned to the SOC. When the mobile station subsequently receives a transmission containing the SID and not the SOC, the mobile station accesses the memory to determine the priority value associated with the SID, and then controls the operation of the mobile station based on the determined priority value. Controlling the operation of the mobile station may control at least one of a scanning behavior or a camping behavior of the mobile station.

SUMMARY OF THE INVENTION

The foregoing and other problems are overcome, and other advantages are realized, in accordance with the teachings of this invention.

In a first aspect thereof the invention provides a method to perform system selection with a mobile station, comprising invoking an overlay function; determining if a set of overlay parameters specify that a higher priority system is to be acquired and, if so, initiating a scan to attempt to acquire the higher priority system using overlay parameters, else attempting to acquire a lower priority system (i.e., a system having a priority that is currently lower than that of the currently preferred system, which may thus be considered to be a higher priority system).

In one configuration, the overlay is configured to first acquire a home network and when the MS cannot acquire a home network, it attempts to acquire a system in accordance with a normal procedure, such as one specified in Preferred lists, such as PRL for CDMA and PLMN List for GSM, similarly for other systems.

In another aspect thereof the invention provides a mobile station that comprises at least one radio frequency transceiver, a data processor and a memory coupled to the data processor. The memory stores information comprising an overlay function and overlay parameters for use by the data processor to perform system selection by invoking the overlay function to determine if the overlay parameters specify that a higher priority system is to be acquired and, if so, to initiate a scan using the transceiver to attempt to acquire the higher priority system using higher priority system-related overlay parameters, else attempting to acquire a lower priority system.

In a further aspect thereof the invention provides a computer program stored on a computer readable medium the execution of which by a processor of a mobile station performs system selection by operations that comprise invoking an overlay function; determining if a set of overlay parameters specify that a higher priority system is to be acquired; and if so, initiating a scan to attempt to acquire the higher priority system using home system-related overlay parameters, else attempting to acquire a lower priority system. When a lower priority system is selected and acquired, the overlay function may operate to initiate a background scan for a higher priority system.

In yet another aspect thereof the invention provides a multimode mobile station that comprises at least one radio frequency transceiver means, data processor means and memory means coupled to the data processor means. The memory means stores information comprising an overlay function and overlay parameters for use by the data processor means to perform system selection by invoking the overlay function to determine if the overlay parameters specify that a higher priority system is to be acquired and, if so, to initiate a scan using the transceiver means to attempt to acquire the higher priority system using higher priority system-related overlay parameters, else attempting to acquire a lower priority system. If the attempt to acquire the higher priority system is not successful, the data processor means executes the overlay function to attempt to acquire the lower priority system, and where after acquiring the lower priority system, execution of the overlay function further comprises making a determination if the overlay parameters specify that the mobile station is to perform a background scan for the higher priority system and, if so, using the transceiver means to periodically scan for the higher priority system in an attempt to acquire the higher priority system.

In yet another aspect thereof the invention provides a method to perform system selection with a mobile station that comprises invoking an overlay function; determining if a set of overlay parameters specify that a higher priority system is to be acquired and, if so, initiating a scan to attempt to acquire the higher priority system using higher priority system-related overlay parameters, else attempting to acquire a lower priority system. The method further includes changing a content of the overlay parameters with information transmitted to the mobile station, such as by the use of an over-the-air programming technique.

In a further aspect thereof the invention provides a method for performing system selection with a mobile station, comprising a step for invoking an overlay function; a step for determining if a set of overlay parameters specify that a higher priority system is to be acquired and, if so, a step for initiating a scan to attempt to acquire the higher priority system using higher priority system-related overlay parameters, else executing a step for attempting to acquire a lower priority system.

In a further aspect thereof the invention provides a data structure for storage in a memory of a multimode mobile station for use by a system selection overlay function. The data structure comprises information for specifying whether the overlay function, after being invoked, is to first scan for a higher priority system or is to first scan for a lower priority system, where the information further comprises system acquisition parameters. The information may further specify whether the overlay function is to rescan for the higher priority system in the event the lower priority system is acquired, and at least one rescan-related parameter. The acquisition parameters and/or the overlay function itself may be stored in a removable user identity module, such as a smart card or similar removable computer readable storage media.

In another aspect, the invention provides a computer program stored on a computer readable medium. Execution of the program by a processor of a multimode mobile station performs system selection by operations that include invoking a current configuration of a configurable overlay function, determining from the current configuration a set of overlay parameters that specify how a system is to be acquired, and initiating a scan to attempt to acquire the system using the set of overlay parameters of the current configuration. Also stored on the computer readable medium may be alternative configurations for the overlay function.

In yet another aspect, the invention provides a multimode mobile station that has at least one radio frequency transceiver means, data processor means and memory means coupled to the data processor means. The memory means stores information that includes an overlay function that is dynamically configured with a current configuration, and overlay parameters. The overlay parameters are used by the data processor means to perform system selection by invoking the overlay function in its current configuration to initiate a scan using the transceiver means to attempt system acquisition using the overlay parameters and the current configuration.

BRIEF DESCRIPTION OF THE DRAWINGS

The foregoing and other aspects of the various non-limiting embodiments of this invention are made more evident in the following Detailed Description of the Preferred Embodiments, when read in conjunction with the attached Drawing Figures, wherein:

FIG. 5 shows the overlay parameters of FIGS. 1 and 3 in further detail;

FIG. 6 shows in further detail the Configuration table of FIG. 5; and

DETAILED DESCRIPTION OF THE PREFERRED EMBODIMENTS

It is preferred that a multimode system selection architecture in the wireless communications device, also referred to herein as a mobile station (MS), be based on an overlay function that is common to multiple systems, such as 3GPP (Third Generation Partnership Project), 3GPP2 (Third Generation Partnership Project Two) and other systems such as, but not limited to, wireless local area network (WLAN) and Wi-Fi.

In the ensuing discussion a currently preferred system will be considered to be a higher priority system than a currently non-preferred system, which may thus be considered to be a lower priority system relative to the higher priority system. The currently higher priority system may be a home system of the MS.

Figure 1:
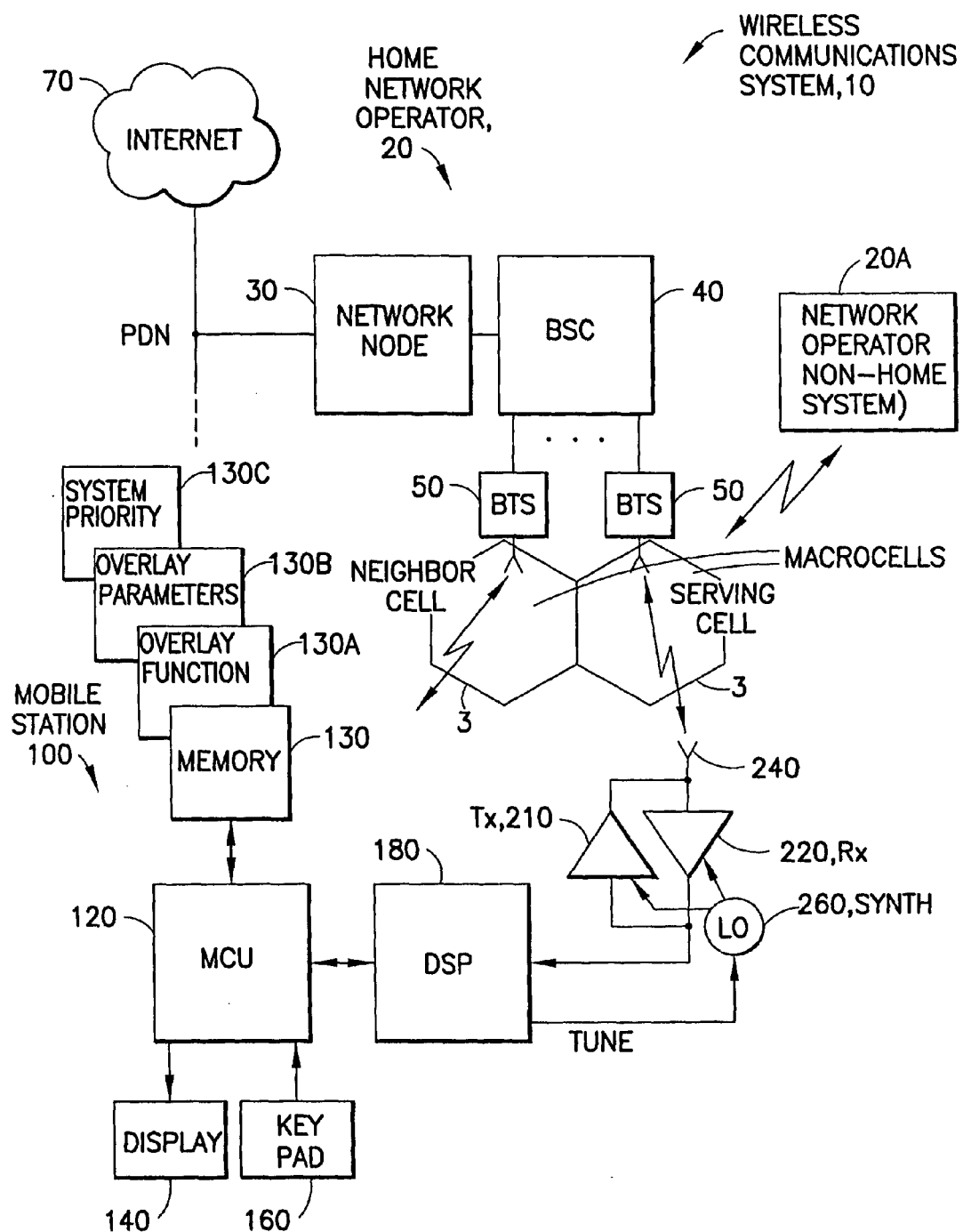
FIG. 1 is a simplified block diagram an embodiment of a wireless communications system that includes a mobile station that is suitable for practicing this invention.

By way of introduction, and referring to FIG. 1, there is shown as a simplified block diagram an embodiment of a wireless communications system 10 that is suitable for practicing this invention. The wireless communications system 10 includes at least one mobile station (MS) 100. FIG. 1 also shows an exemplary network operator 20 having, for example, a node 30 for connecting to a telecommunications network, such as a Public Packet Data Network or PDN, at least one base station controller (BSC) 40 or equivalent apparatus, and a plurality of base transceiver stations (BTS) 50, also referred to as base stations (BSs), that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. A cell 3 is associated with each BTS 50, where one cell will at any given time be considered to be a serving cell, while an adjacent cell(s) will be considered to be a neighbor cell. Smaller cells (e.g., picocells) may also be available.

The air interface standard can conform to any suitable standard or protocol, and may enable both voice and data traffic, such as data traffic enabling Internet 70 access and web page downloads. In the presently preferred embodiment of this invention the air interface standard is compatible with a code division multiple access (CDMA) air interface standard, such as one known as cdma2000, although this is not a limitation upon the practice of this invention.

It may be assumed that at least one second network operator 20A may be present in the same geographical area as the network operator 20. Relative to the MS 100, the network operator 20 may be a home system network operator, while the second network operator 20A may represent a non-home network operator. In this case the home system network operator 20 is assumed to be the preferred network operator for the MS 100 to acquire and register with. In certain instances such as where the home network operator is not available in a particular geographic region, the preferred network operator may be other than the home network operator. The following description presumes that the home network operator is available, and is the preferred network operator.

The mobile station 100 typically includes a control unit or control logic, such as a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

In general, the various embodiments of the MS 100 can include, but are not limited to, cellular telephones, personal digital assistants (PDAs), portable computers, image capture devices such as digital cameras, gaming devices, music storage and playback appliances, Internet appliances permitting Internet access and browsing, as well as portable units or terminals that incorporate combinations of such functions.

The MCU 120 is assumed to include or be coupled to some type of a memory 130, including a non-volatile memory for storing an operating program and other information, as well as a volatile memory for temporarily storing required data, scratchpad memory, received packet data, packet data to be transmitted, and the like. At least some of this temporary data can be stored in a data buffer. The operating program is assumed, for the purposes of this invention, to enable the MCU 120 to execute the software routines, layers and protocols required to implement the methods in accordance with this invention, as well as to provide a suitable user interface (UI), via display 140 and keypad 160, with a user. Although not shown, a microphone and speaker are typically provided for enabling the user to conduct voice calls in a conventional manner.

The mobile station 100 also contains a wireless section that includes a digital signal processor (DSP) 180, or equivalent high speed processor or logic, as well as at least one wireless transceiver that includes a transmitter 210 and a receiver 220, both of which are coupled to an antenna 240 for communication with the network operator. At least one local oscillator, such as a frequency synthesizer (SYNTH) 260, is provided for tuning the transceiver. Data, such as digitized voice and packet data, is transmitted and received through the antenna 240.

The MS 100 is assumed for the purposes of this invention to be a multimode capable MS, that is, the MS 100 is capable of operating with more than one wireless network, such as with a cdma2000 network and with, by example, a GSM network.

The process of the MS selecting a network may be controlled by a dynamically alterable current configuration of the overlay function which determines the mode of operation of the overlay function 130A. In one configuration, the MS 100 attempts to select a home network first before trying to acquire another preferred network. In another configuration, the MS 100 attempts to first scan a list of networks based on previous experience, such as recently acquired networks, before attempting to find other networks. As a general rule, the MS 100 attempts to acquire a network having a systems supported in the MS 100, such as systems of cdma2000 family, GSM, WLAN, Wi-Fi and other possible systems supported in the MS 100.

The current configuration may be changed dynamically, such as by a remote instruction communicated over an air interface (over-the-air or OTA). In a preferred current configuration, the MS 100 attempts to first acquire a home network. Another configuration may scan a list of most recently acquired channels and perform network selection based on those channels. Another configuration may be to not scan for the home network, but to follow normal procedures in acquiring a channel (e.g., following the preferred roaming list for CDMA, or a PLMN list for GSM, and similarly preferred lists for other systems), and acquire the network that assigns a channel to the MS 100. Any of the above techniques is capable of yielding a preferred network, but differ in how the preferred network is defined.

The current configuration may be changed either through at least one of changing the overlay parameters, or the logic implemented in the overlay function, i.e., through over-the-air OTA management via an OTA protocol such as one of the following non-limiting examples: CDMA OTASP/OTAPA (C.0016 standards and revisions), IOTA-DM, OMA DM. One or both of the overlay function 130A and the overlay parameters 130B may be revised OTA.

It can be noted that the following description is in the context of the current configuration being a preferred one, that is, scanning for the home network first, and if unsuccessful, scanning for a non-home network. However, and as should be apparent, this is not to be construed as a limitation on the implementation and/or practice of the teachings in accordance with this invention.

Figure 2:
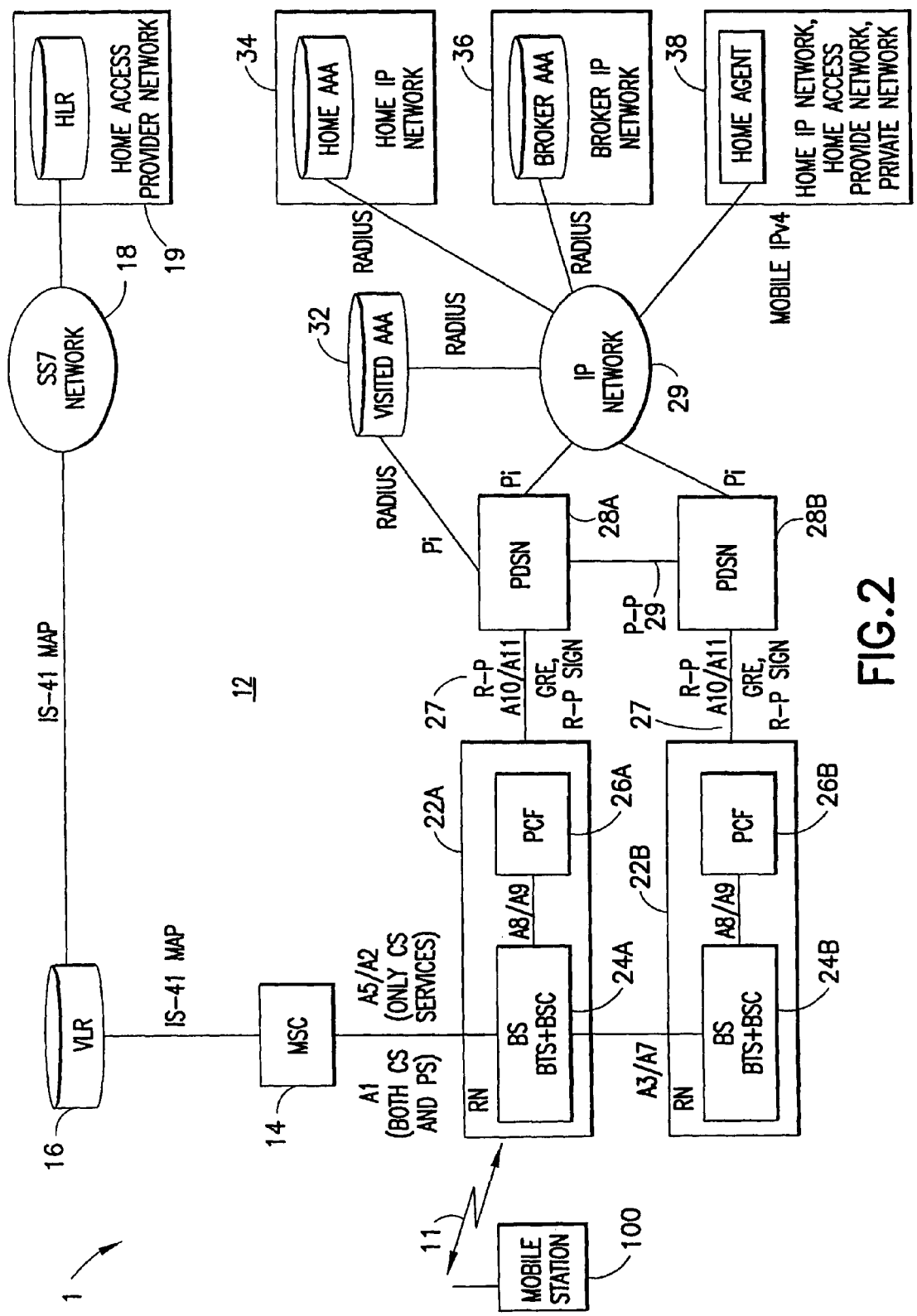
FIG. 2 is simplified block diagram of a wireless communication system, specifically a cdma2000 1x system, that is suitable for use in practicing the teachings of this invention.

FIG. 2 is simplified block diagram of a wireless communication system 1, specifically a cdma2000 1x system, that is one suitable and non-limiting example of a system for use in practicing the teachings of this invention. A description of FIG. 2 will be provided in order to further place this invention into a suitable technological context. However, it should be appreciated that the specific network architecture and topology shown in FIG. 2 is not to be construed in a limiting sense upon this invention, as this invention could be practiced in networks having an architecture and topology that differs from that shown in FIG. 2. Further, the general concepts of this invention may be practiced as well in a TDMA-based network, and is thus not limited for use only in a CDMA network. As such, while reading the ensuing description it should be noted that while some aspects of the description are specific to a CDMA network, the description is not intended to be read in a limiting sense upon the implementation, use and practice of this invention.

The wireless communication system shown in FIG. 2 includes at least one MS 100, as depicted also in FIG. 1. The MS 100 is assumed to be compatible with the physical and higher layer signal formats and protocols used by a network 12, and to be capable of being coupled with the network 12 via a wireless link 11. In the presently preferred embodiments of this invention the wireless link 11 is a radio frequency (RF) link, although in other embodiments the wireless link 11 could be an optical link.

In a conventional sense the network 12 includes a mobile switching center (MSC) 14 coupled through an IS-41 Map interface to a visitor location register (VLR) 16. The VLR 16 in turn is coupled through an IS-41 Map interface to a switching system seven (SS-7) network 18 and thence to a home location register (HLR) 19 that is associated with a home access provider network of the MS 100. The MSC 14 is also coupled through an A1 interface (for circuit switched (CS) and packet switched (PS) traffic) and through an A5/A2 interface (CS services only) to a first radio network (RN) 22A. The first RN 22A includes a base station (BS) 24A that includes a base transceiver station (BTS) and a base station center (BSC) that is coupled through an A8/A9 interface to a Packet Control Function (PCF) 26A. The PCF 26A is coupled via an R-P (PDSN/PCF) interface 27 (also called an A10/A11 interface) to a first packet data service node (PDSN) 28A and thence to an IP network 29 (via a Pi interface). The PDSN 28A is also shown coupled to a visited access, authorization and accounting (AAA) node 32 via a Pi and a remote authentication dial-in service (RADIUS) interface, that in turn is coupled to the IP network 29 via a RADIUS interface. Also shown coupled to the IP network 29 via RADIUS interfaces are a Home IP network AAA node 34 and a Broker IP network AAA node 36. A home IP network/home access provider network/private network Home Agent 38 is coupled to the IP network via a Mobile IPv4 interface. In accordance with RFC3220, the Home Agent 38 is a router on the home network of a mobile node (the MS 100 in this description) that tunnels datagrams for delivery to the mobile node when it is away from home, and that maintains current location information for the mobile node.

Also shown in FIG. 2 is a second RN 22B that is coupled to the first RN 22A via an A3/A7 interface. The second RN 22A includes a BS 24B and a PCF 26B and is coupled to a second PDSN 28B. The PDSN 28A and the PDSN 28B are coupled together through a P-P interface 29 (PDSN to PDSN interface, defined in IS835C).

It should be noted, however, that there may be a plurality of BSs 24 connected to a single PCF 26 (defining a BS subnet), and that there may be a plurality of PCFs 26 within a given network all connected to a single PDSN 28. It may thus be the case that the source or anchor BS and the target BS may exist in the same BS subnet. Also, the source or anchor and target PCF may exist in the same network served by a single PDSN 28.

The invention provide methods, apparatus and computer program product to achieve more rapid home network selection with the multimode-capable MS 100. To this end the memory 130 is assumed to include a system selection overlay function 130A that is linked to overlay parameters 130B to facilitate system selection, where the overlay parameters 130B may be implemented as a table and include information to acquire a wireless system in a home network. A system priority table 130C, discussed in further detail below, is also typically provided.

It should be noted that the overlay function 130A (as well as the overlay parameters 130B) may be stored in the MS 100, or in a "smart card" such as a Removable User Identity Module (R-UIM) or a Subscriber Identity Module (SIM), as two non-limiting examples.

As is shown in FIG. 5 and discussed in further detail below, the overlay parameters 130B may actually be implemented as three tables: a Configuration table 131A, the System Priority Table 130C, and an Overlay Performance Parameters table 131B.

The overlay function 130A may be considered generally a program that resides in or that is otherwise coupled to a multimode mobile station, and performs the function of network selection in the mobile station. It may be implemented as part of the radio software. The overlay function 130A may incorporate the logic of selecting a network in the higher priority system based on a predefined set of criteria and the current configuration.

The overlay parameters 130B may be considered as a data structure for storage in the memory 130 of the multimode MS 100 for use by the system selection overlay function 130A. The data structure comprises information for specifying whether the overlay function 130A, after being invoked, is to first scan for a home system or is to first scan for a non-home system, and further comprises system acquisition parameters. As described in further detail below, the information found in the overlay parameters data structure may further specify whether the overlay function is to rescan for the home system in the event the non-home system is acquired, and at least one rescan-related parameter, such as a rescan interval.

When using the higher priority system selection technique the overlay function 130A first looks to the overlay parameters 130B to ascertain the current configuration. If the overlay parameters 130B are configured to specify that the MS 100 is to perform initial home network selection, the overlay function 130A uses this information, as well as other parameters (such as a scan interval for background scan operations) to acquire a home network 20. This information in the overlay parameters 130B preferably includes the acquisition parameters, which may include an indexed list of RF channels to search for the home system 20 (e.g., both GSM and CDMA systems), and/or applicable System and Network identification information. The overlay function 130A of the MS 100 preferably examines the overlay parameters 130B and attempts to locate the home network 20. If the home network 20 is found the MS 100 acquires the home network and registers with the home network. If the home network 20 is not found, the MS 100 scans the remainder of the overlay parameters 130B, which preferably include a system preference, and selects the most higher priority system and attempts to acquire a network in the most higher priority system using, as non-limiting examples, a corresponding Preferred Roaming List (PRL) 131E (CDMA, shown in FIG. 3) or a Public Land Mobile Network (PLMN) list 130D (GSM/UMTS, also shown in FIG. 3). There may be other access parameter lists, such as a WLAN list 130E (also shown in FIG. 3).

It is pointed out that the overlay parameters 130B may be provided to MS 100 remotely, such as through an air interface at regular update intervals, or as the MS 100 enters a particular geographic area.

When the configuration is set for normal procedures of system selection, the overlay function 130A follows the system selection using system preference and preferred lists of networks based on the system preference. Thus, in addition to home network identification information, the overlay parameters 130B preferably include a system preference for systems other than those systems supported by the home network. The MS 100 may operate such that the overlay parameters 130B are used to indicate if a background scan for a home network (of both CDMA and non-CDMA systems) should be performed.

Figure 3:
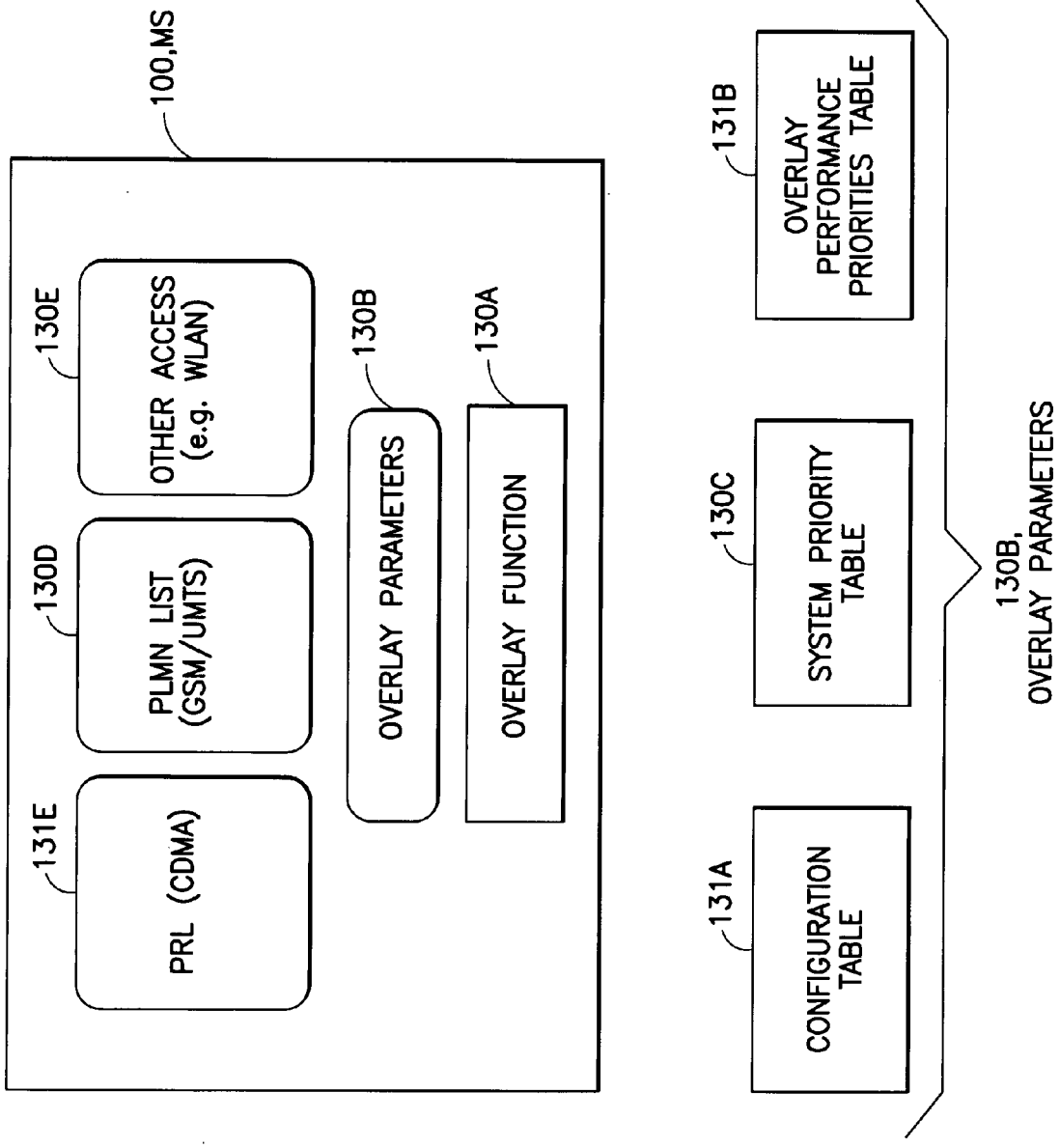
FIG. 3 illustrates the MS 100 in further detail, in particular the overlay function, overlay parameters and system selection information in accordance with this invention.

FIG. 3 shows in greater detail the basic components of the overlay framework in the MS 100. In addition to the overlay function 130A, which is common to all access technologies, and the associated overlay parameters 130B, there are the preferred lists of systems and networks for various access technologies. As shown in FIG. 3, the multimode MS 100 may have preference list for network selection for each access system, following respective standards for system selection.

For example, the PRL 131E, PLMN List 130D and network preference lists 130E for other access systems. The overlay function 130A incorporates logic to select the best system based on a plurality of input factors. The criteria may include user preferences, operator preferences, thresholds to avoid system selection ping-pong effects and available services. The parameters related to these criteria are parameterized as the overlay parameters 130B for use by the overlay function 130A.

The procedures described herein employ overlay configuration data in the overlay parameters 130B. The overlay configuration data can be stored in a removable non-volatile memory (e.g., in SIM/R-UIM/UICC), or more generally in the MS memory 130.

In the presently preferred embodiments the overlay configuration information may include, but need not be limited to:
information on home networks (CDMA and non-CDMA);
criteria for background scan (e.g., scan interval); and
parameters specifying operator choice. These include, as non-limiting examples, whether to perform initial home network selection and whether to perform reselection for the home network if not initially acquired, or the parameters may specify that the MS 100 should follow only normal system selection procedures (e.g., locating a higher priority system using system acquisition records).

Figure 4:
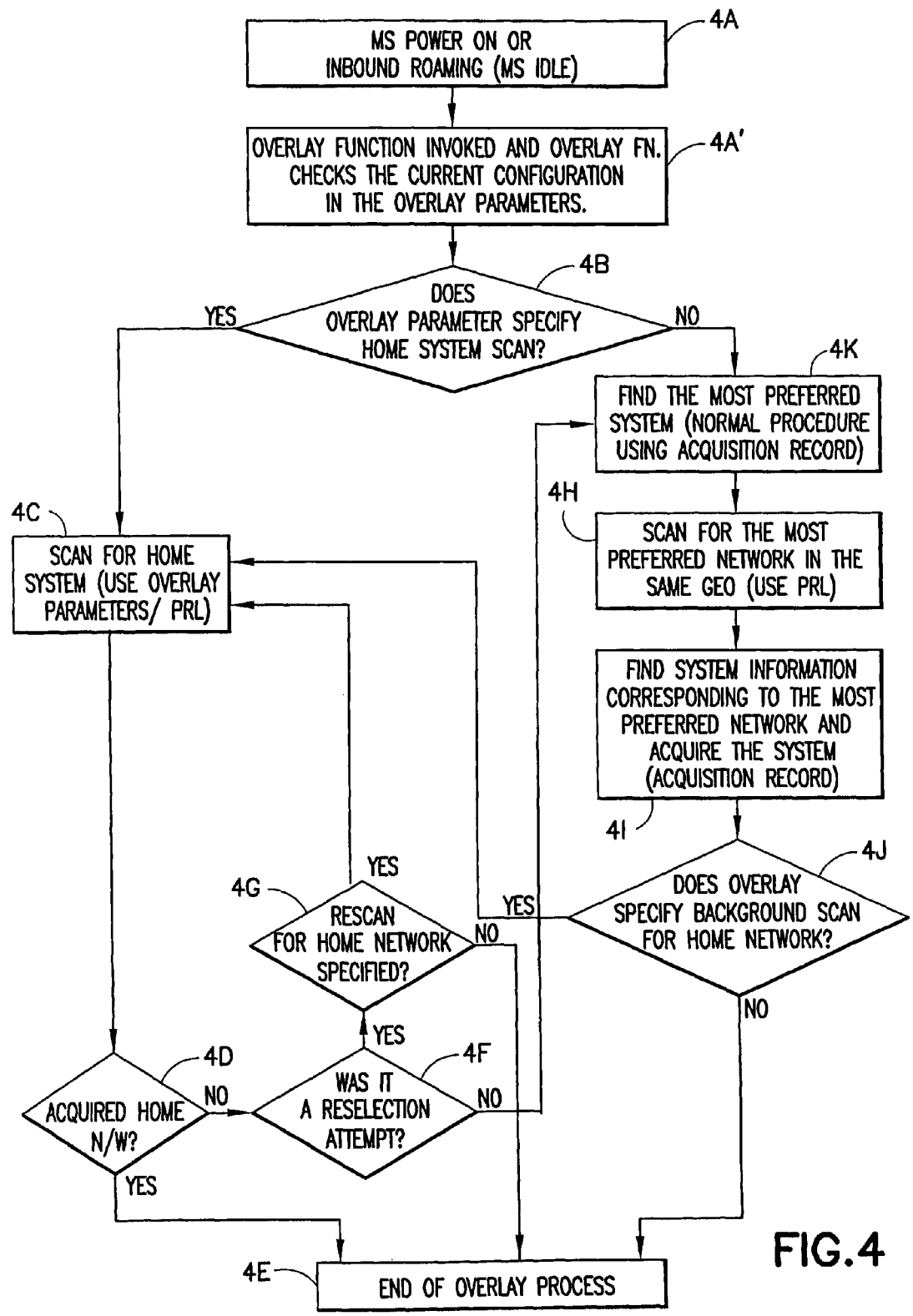
FIG. 4 is a logic flow diagram that depicts a procedure for multimode system selection using initial home network selection and reselection, as executed by the overlay function shown in FIGS. 1 and 3.

FIG. 4 is a logic flow diagram that depicts a presently preferred procedure for multimode system selection using initial home network selection and reselection, as executed by the overlay function 130A.

On MS 100 power on, or when the MS 100 is roaming, and in the Idle mode (block 4A), the overlay function 130A is invoked, and checks the current configuration in the overlay parameters 130B (block 4A'). The overlay function 130A checks if overlay parameters 130B specifies a home system scan (block 4B), it being recalled that the overlay parameters 130B include the information needed for multimode system selection and home network selection. This information can include system preferences for multimode operation, the indexed list of RF channels (channel numbers or blocks), as well as home network identifying information, such as a System Identification/Network Identification (SID/NID) code or a Mobile Network Code/Mobile Country Code (MNC/MCC). The overlay parameters 130B may also indicate if the MS 100 should attempt to locate a home network on power on (initial home network selection), or whether it should follow the normal procedure of finding any preferred network.

When home network acquisition information is specified in the overlay parameters 130B, the overlay function 130A attempts to acquire the home network based on this information and registers to the home network. This is shown in FIG. 4 by the block 4C where the MS 100 scans for the home system 20 using the overlay parameters 130B. If the home network is acquired (block 4D), control passes to block 4E to tend the overlay function process. If the home network is not acquired at block 4D, control passes to block 4F where a determination is made if the acquisition process was a reselection attempt on the part of the MS 100. If it was, control passes to block 4G to determine if the overlay parameters 130A specify a rescan for the home network. If a rescan is specified, then control passes back to block 4C to perform the rescan. If a rescan is not specified at block 4G, then control passes to block 4E to end the overlay function process. Returning to block 4F, if it is determined instead that a reselection was not being attempted, control passes to block 4K, as it does if the test at block 4B indicates that the overlay parameters 130B do not specify a home system scan. At block 4K the overlay function 130A of the MS 100 identifies the higher priority system based on the conventional (normal) procedure of using the stored record of previous system acquisitions. At block 4H the MS 100 scans for the most preferred network in the same geographical area (e.g., using the PRL 131E), and in block 4I the MS 100 finds the system information corresponding to the most preferred network and acquires the system. The overlay parameters 130B are then tested, at block 4J, to determine if they specify that the MS 100 is to perform a background scan for the home network (while registered with the most preferred network). If they do not, then control passes to block 4E to terminate the operation of the overlay function 130A, otherwise control passes to block 4C to perform the scan for the home system 20, as described above.

Note that when the overlay parameters 130B does not specify initial home network selection, or if the initial home network selection fails, the normal procedure of finding the most preferred network using the preferred roaming list (PRL) 131E is followed.

In this mode of operation, and when the background scan for the home network is specified in the overlay parameters 130B (block 4J), the overlay function 130A uses the home network information provided in the overlay parameters 130B (or in the PRL 131E), and attempts to locate a home network of either a CDMA or a non-CDMA system (e.g. a GSM/UMTS system).

Note that in block 4B, when the information to acquire the home network is not included in the overlay parameters 130B, the overlay function 130A switches to select a preferred network based on the system preference specified in the overlay parameters 130B. The overlay parameters 130B thus preferably include a system preference indicating an order of preference of various systems (e.g., CDMA, followed by GSM, possibly followed by WLAN).

Note further that when the reselection process fails to find a home network, the process is continued as specified in the overlay parameters 130B. For example, block 4G makes the determination as to whether a rescan for the network is specified. The background rescan interval (how often the MS 100 is to scan for the home system), as well as any other criteria for system reselection, are preferably specified in the overlay parameters 130B.

For example, the preferred embodiments of this invention are also applicable for use with, as non-limiting examples, IOTA (IP based over-the-Air Terminal Management), IOTA-DM (IOTA-Device Management), OTAPA (Over-the-Air Parameter Administration) and OTASP (Over-the-Air Service Provisioning) operations and procedures. It should thus be noted that the content of the overlay parameters 130B may be changed during operation of the MS 100, such as by downloading new parameters, and/or replacing or modifying existing parameters. For example, a network operator may download parameters to the MS 100 to selectively turn on and off the home system scan, thereby affecting the operation of the overlay function 130A at block 4B of FIG. 4.

One preferred mode of implementation uses Internet Protocol (IP) based protocols for OTA messaging for overlay management, such as the OMD DM protocol. Information required for acquiring the home network may be programmed using the OTA method. If security of an OTA update is of concern, the OMA DM protocol may be used, as it offers levels of security in addition to Transport Layer Security (TLS) and air-interface security.

Discussed now is a parameterized approach to system selection in accordance with embodiments of this invention.

In this approach, the overlay function 130A behaves based on the current configuration in the overlay parameters 130B. The overlay function 130A checks the current configuration in the overlay parameters 130B. The overlay parameters 130B may be embodied as a table of entries indicating the current configuration. There is a different table for specifying system priority, i.e., the above-mentioned system priority table 130C that specifies the systems in an order of priority. Home systems may be specifically marked to enable selection of a home system as described above with regard to FIG. 4, thus enabling faster home system selection on power-up or rescan. During rescan the overlay function 130A attempts to find a home system if the current configuration is thus set.

Referring to FIG. 5, and as was noted previously, there may be three tables in the overlay parameters 130B: the Configuration table 131A, the System Priority Table 130C, and the Overlay Performance Parameters table 131B.

The Configuration table 131A may have the form shown in FIG. 6, and can include an Overlay Mode and a corresponding (current) Status (enabled/disabled). The Overlay Mode can include, as non-limiting examples, Manual, Automatic (with initial home system selection), Automatic (with initial selection of any higher priority system), Reselection (reselection for home system), Reselection (for any higher priority system), Home network selection, and Service Based. One or more of these configurations may be set (enabled) at any given time. For example, Automatic (with initial selection of any higher priority system) may be enabled along with Reselection (for any home system).

In the Manual mode the MS 100 stops invoking the overlay function 130A, and the user selects a system from a predefined table displayed through a menu. In such a case stopping the use of the overlay function 130A may conserve battery power, since there may be no need for periodic background reselection to be performed when the system is selected manually by the user.

Even when the user manually selected a system, it is possible to enable reselection, for example to aid in finding the best system (considering the criteria of, for example, cost and performance of the air interface) as designed in the overlay logic (i.e., an algorithm implemented in the overlay function).

It is possible for the network operator to manage the configuration, such as when the operator wishes to disable the user from selecting a system manually. The operator may lock the configuration such that the user is unable to acquire a system manually.

A Geo-based mode may be implemented in each geographic location.

It is noted that invoking the use of the overlay function 130A may occur in response to the MS 100 detecting, such as when in the idle mode, from a paging message parameter that it has entered a new location.

It is typically the case that at the overlay level only a system (e.g., a CDMA800, CDMA1900, GSM800, GSM1900, WCDMA850 or WLAN system) is selected. After selecting a system, a network in the system is acquired using the PRL, PLMN etc. But it is possible to specify in the overlay mode 'Home Network Selection'. This aids in achieving faster home network acquisition. For example, a given operator may have both CDMA and GSM networks. When the MS 100 is camping on a non-home CDMA network (because a CDMA network operated by the home operator is not available in this location), it is possible to perform a background scan to find a home GSM network at the same location.

Figure 7:
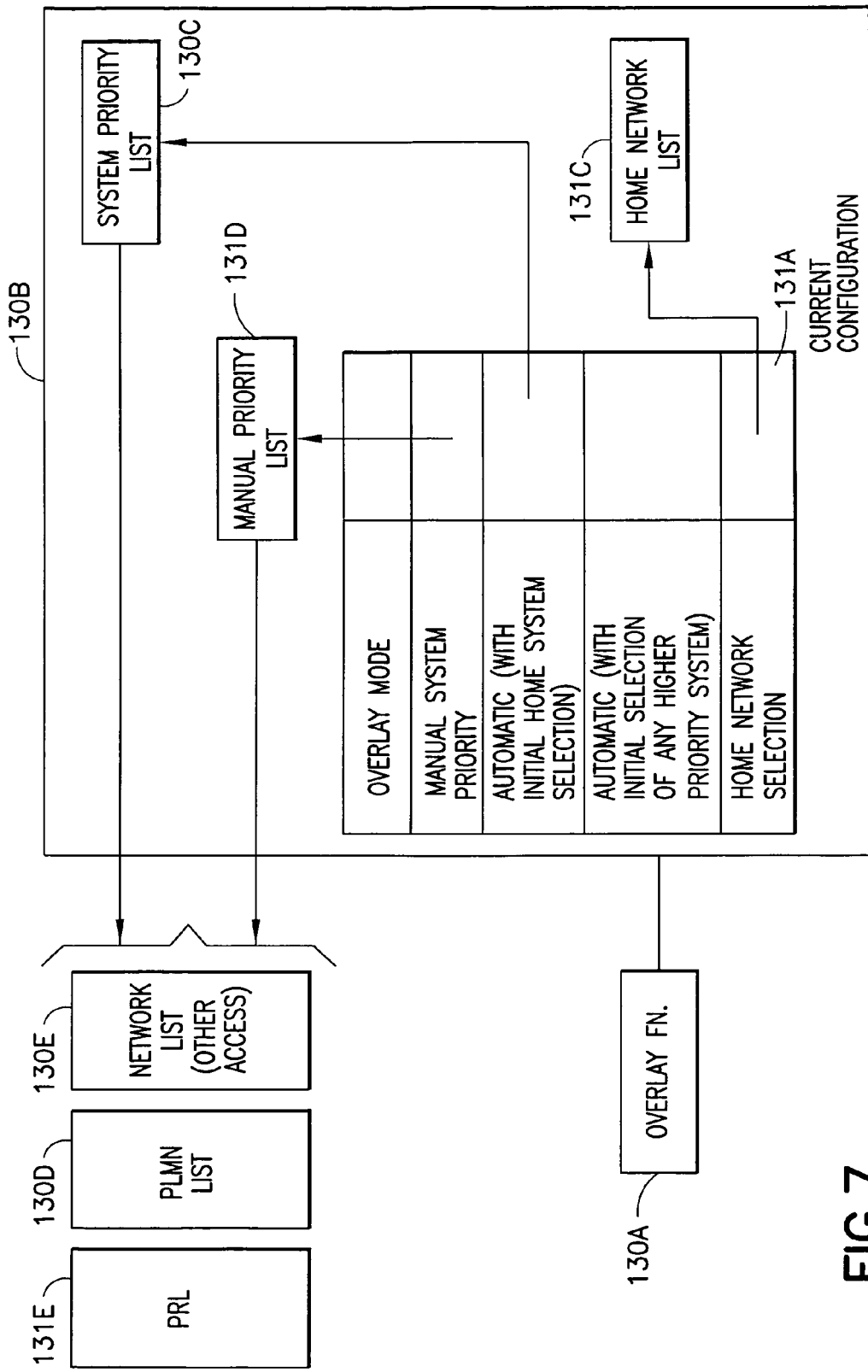
FIG. 7 shows in even greater detail the overlay parameters of FIGS. 1, 3 and 5.

When 'Home Network Selection' is at the overlay level, a Home Network list 131C is also preferably provided in the overlay parameters, as is shown in FIG. 7. This aids in faster home network selection (without going through the PRL 131E or PLMN 130D or other network list 130E) at the overlay level. The procedure for this mode was explained above in relation to FIG. 4.

When the mode is set to 'Service Based', subsequent system and network selection is based on the availability of desired services. This may be linked to suitable service discovery methods to detect the best system and network.

Other modes than just those shown in FIGS. 6 and 7 may also be employed. As is shown in FIG. 7, the overlay function 130A first checks the Overlay configuration table 131A (Overlay mode). Depending on the configuration either manual settings or system priorities (for automatic selection) is used to select the higher priority system, as specified in a Manual Priority List 131D or the System Priority list 130C. Once the system is decided, the network in the selected system is acquired using the PRL list 131E, the PLMN List 130D, or the WLAN SSID list (or other) list 130E, depending on the system selected. For example, if a CDMA system is selected the PRL list 131E is used, as it is compatible with CDMA standards. If a GSM system is selected the corresponding PLMN List 130D is used to acquire a-network in the GSM system.

It is within the scope of this invention to display the content of the Manual Priority list 131D to the user.

There are various flow sequences possible based on the configuration in the overlay parameters table 130B. The flow sequence when Automatic (initial home system selection) is set was described above with regard to FIG. 4.

The System Priority list 130C may be implemented as a separate table. Each entry preferably includes the system and the band information, such as cdma2000 (1900 band), GSM 1900, WCDMA850, WLAN and WiFi, as non-limiting examples. In addition, it is preferred to indicate the home system, which aids in the home system selection as described in FIG. 4. The System Priority list 130C preferably links to the corresponding network priority list (PRL 131E, PLMN 130D, or Network Priority list 130E for other systems).

The Overlay Performance Parameters 131B table, mentioned above with regard to FIG. 5, may include, but is not limited to, a power measurement threshold level for each system (to decide when to switch to another system), a frequency of background scan for each system (to manage battery life) as well as service-related parameters.

The embodiments of this invention may be implemented by computer software executable by a data processor of the MS 100, such as the MCU 120, or by hardware, or by a combination of software and hardware. Further in this regard it should be noted that the various blocks of the logic flow diagram of FIG. 4 may represent program steps, or interconnected logic circuits, blocks and functions, or a combination of program steps and logic circuits, blocks and functions.

The applicant hereby defines plurality to mean one or more.

The foregoing description has provided by way of exemplary and non-limiting examples a full and informative description of the best methods and apparatus presently contemplated by the inventor for carrying out the invention. However, various modifications and adaptations may become apparent to those skilled in the relevant arts in view of the foregoing description, when read in conjunction with the accompanying drawings and the appended claims. As but some examples, the use of other similar or equivalent system and operator types, as well the use of different mobile equipment, may be attempted by those skilled in the art. However, all such and similar modifications of the teachings of this invention will still fall within the scope of the teachings of this invention.

Furthermore, some of the features of this invention may be used to advantage without the corresponding use of other features. As such, the foregoing description should be considered as merely illustrative of the principles, teachings and embodiments of this invention, and not in limitation thereof.

What is claimed is:

1. A method comprising:
   invoking an overlay function configured to assist an apparatus in performing system selection among a plurality of different types of systems based on a set of overlay parameters, wherein the set of overlay parameters comprises an indication of system priority among the plurality of different types of systems, wherein the indication of system priority does not include an indication of priority among different networks of a system, wherein the set of overlay parameters does not comprise a preferred roaming list or a public land mobile network list; and
   in response to determining that the set of overlay parameters specifies that a higher priority system is to be acquired, initiating a scan to attempt to acquire a network of the higher priority system, wherein priority among networks of the higher priority system is specified separately from the set of overlay parameters.

2. The method as in claim 1, where invoking occurs in response to power on of the apparatus.

3. The method as in claim 1, where invoking occurs in response to the apparatus roaming.

4. The method as in claim 1, where if the attempt to acquire the higher priority system is not successful, attempting to acquire a lower priority system.

5. The method as in claim 4, further comprising: in response to a successful attempt to acquire the lower priority system, determining if the set of overlay parameters specify that the apparatus is to perform a background scan for the higher priority system and, if so, periodically scanning for the higher priority system in an attempt to acquire the higher priority system.

6. The method as in claim 1, where the set of overlay parameters comprises at least one of a list of radio frequency channels with which to search for a preferred system and a network identification of a preferred network.

7. The method as in claim 6, where the network identification comprises at least two of the following: a network identifier, a system identifier, a mobile country code, and a mobile network code.

8. The method as in claim 1, where the set of overlay parameters comprises network identification information.

9. The method as in claim 1, where the set of overlay parameters is configured remotely over an air interface.

10. The method as in claim 1, where when the higher priority system comprises a code division multiple access (CDMA) system, a preferred roaming list is used to acquire the CDMA system.

11. The method as in claim 1, where when the higher priority system comprises a global system for mobile communications (GSM) system, where initiating a scan comprises using a public land mobile network list to attempt to acquire the GSM system.

12. The method as in claim 1, where when the higher priority system comprises a wireless local area network (WLAN) system, wherein initiating a scan comprises using WLAN information to attempt to acquire the WLAN system.

13. The method as in claim 1, where attempting to acquire the higher priority system uses an acquisition record stored in the apparatus.

14. The method as in claim 1, further comprising:
   changing a content of the set of overlay parameters with information transmitted to the apparatus.

15. The method as in claim 14, where changing the content of the set of overlay parameters comprises using an over-the-air programming technique.

16. The method as in claim 1, where invoking occurs in response to the apparatus being in an idle state.

17. The method as in claim 1, where invoking occurs in response to the apparatus detecting from a paging message parameter that it has entered a new location.

18. The method as in claim 1, where invoking occurs in response to the apparatus being in an idle state and detecting from a paging message parameter that the apparatus has entered a new location.

19. The method as in claim 1, further comprising:
   in response to determining that the set of overlay parameters specifies that a home network scan is to be performed, scanning for a home network; and
   in response to detecting the home network, attempting to acquire the home network.

20. The method as in claim 19, wherein the set of overlay parameters comprises acquisition parameters for the home network.

21. The method as in claim 20, wherein the acquisition parameters comprise an indexed list of radio frequency channels to search.

22. The method as in claim 19, wherein initiating a scan to attempt to acquire the higher priority system is performed in response to one of a failed scan for the home network or failing to acquire the home network.

23. The method as in claim 22, further comprising: in response to a successful attempt to acquire the higher priority system, determining if the set of overlay parameters specify that the apparatus is to perform a background scan for the home network and, if so, periodically scanning for the home network in an attempt to acquire the home network.

24. The method as in claim 1, wherein the overlay function comprises a configurable overlay function, wherein invoking the overlay function comprises invoking a current configuration of the configurable overlay function.

25. The method as in claim 24, wherein initiating a scan further comprises utilizing the current configuration of the configurable overlay function.

26. The method as in claim 1, wherein initiating the scan comprises using a second set of parameters that specify priority among networks of the higher priority system, wherein the second set of parameters are specified separately from the set of overlay parameters.

27. An apparatus comprising:
   at least one radio frequency transceiver;
   at least one memory configured to store information comprising an overlay function and a set of overlay parameters, wherein the set of overlay parameters comprises an indication of system priority among a plurality of different types of systems, wherein the indication of system priority does not include an indication of priority among different networks of a system, wherein the set of overlay parameters does not comprise a preferred roaming list or a public land mobile network list; and
   a data processor configured to perform system selection among the plurality of different types of systems by invoking the overlay function and, in response to determining that the set of overlay parameters specifies that a higher priority system is to be acquired, initiating a scan using the at least one radio frequency transceiver to attempt to acquire a network of the higher priority system, wherein priority among networks of the higher priority system is specified separately from the set of overlay parameters.

28. The apparatus as in claim 27, where invoking the overlay function occurs in response to power on of the apparatus.

29. The apparatus as in claim 27, where invoking the overlay function occurs in response to the apparatus roaming.

30. The apparatus as in claim 27, where if the attempt to acquire the higher priority system is not successful, the data processor utilizes the overlay function to attempt to acquire a lower priority system.

31. The apparatus as in claim 30, where the data processor in conjunction with the overlay function is further configured, in response to a successful attempt to acquire the lower priority system, to determine if the set of overlay parameters specify that the apparatus is to perform a background scan for the higher priority system and, if so, using the at least one radio frequency transceiver to periodically scan for the higher priority system in an attempt to acquire the higher priority system.

32. The apparatus as in claim 27, where the set of overlay parameters comprises at least one of a list of radio frequency channels with which to search for a preferred system and a network identification of a preferred network.

33. The apparatus as in claim 32, where the network identification comprises at least two of the following: a network identifier, a system identifier, a mobile country code, and a mobile network code.

34. The apparatus as in claim 27, where the set of overlay parameters comprises network identification information.

35. The apparatus as in claim 27, where the overlay function, when attempting to acquire the higher priority system, uses one of a preferred roaming list stored in the at least one memory, a public land mobile network list stored in the at least one memory or wireless local area network access information stored in the at least one memory.

36. The apparatus as in claim 16, where the overlay function, when attempting to acquire the higher priority system, uses an acquisition record stored in the at least one memory.

37. The apparatus as in claim 27, where the at least one memory comprises a smart card configured to store the overlay function and the set of overlay parameters.

38. The apparatus as in claim 27, where the at least one memory comprises a memory configured to store the overlay function and a smart card configured to store the set of overlay parameters.

39. The apparatus as in claim 27, wherein the data processor is further configured, in response to determining that the set of overlay parameters specifies that a home network scan is to be performed, to scan with the at least one radio frequency transceiver for a home network and, in response to detecting the home network, to attempt to acquire the home network using the at least one radio frequency transceiver.

40. The apparatus as in claim 27, wherein the overlay function comprises a configurable overlay function, wherein invoking the overlay function comprises invoking a current configuration of the configurable overlay function, wherein initiating a scan further comprises utilizing the current configuration of the configurable overlay function, wherein the at least one memory is further configured to store an alternate configuration of the configurable overlay function, wherein the data processor is further configured, in response to a command received via the at least one radio frequency transceiver, to replace the current configuration with the alternate configuration.

41. A non-transitory computer readable medium storing a computer program, the execution of which by a processor of an apparatus performs operations comprising:
   invoking an overlay function configured to assist in performing system selection among a plurality of different types of systems based on a set of overlay parameters, wherein the set of overlay parameters comprises an indication of system priority among the plurality of different types of systems, wherein the indication of system priority does not include an indication of priority among different networks of a system, wherein the set of overlay parameters does not comprise a preferred roaming list or a public land mobile network list; and
   in response to determining that the set of overlay parameters specifies that a higher priority system is to be acquired, initiating a scan to attempt to acquire a network of the higher priority system, wherein priority among networks of the higher priority system is specified separately from the set of overlay parameters.

42. The non-transitory computer readable medium as in claim 41, where invoking occurs in response to power on of the apparatus.

43. The non-transitory computer readable medium as in claim 41, where invoking occurs in response to the apparatus roaming.

44. The non-transitory computer readable medium as in claim 41, where invoking occurs in response to the apparatus detecting from a paging message parameter that it has entered a new location.

45. The non-transitory computer readable medium as in claim 41, where invoking occurs in response to the apparatus being in an idle state and detecting from a paging message parameter that it has entered a new location.

46. The non-transitory computer readable medium as in claim 41, where if the attempt to acquire the higher priority system is not successful, attempting to acquire a lower priority system.

47. The non-transitory computer readable medium as in claim 41, said operations further comprising: in response to a successful attempt to acquire the lower priority system, determining if the set of overlay parameters specify that the apparatus is to perform a background scan for the higher priority system and, if so, periodically scanning for the higher priority system in an attempt to acquire the higher priority system.

48. The non-transitory computer readable medium as in claim 41, where the set of overlay parameters comprises at least one of a list of radio frequency channels with which to search for a preferred system and a network identification of a preferred network.

49. The non-transitory computer readable medium as in claim 48, where the network identification comprises at least two of the following: a network identifier, a system identifier, a mobile country code, and a mobile network code.

50. The non-transitory computer readable medium as in claim 41, where the set of overlay parameters comprises network identification information.

51. The non-transitory computer readable medium as in claim 41, where attempting to acquire the higher priority system uses one of a preferred roaming list stored in the mobile station, a public land mobile network list stored in the apparatus or wireless local area network access information stored in the apparatus.

52. The non-transitory computer readable medium as in claim 41, where attempting to acquire the higher priority system uses an acquisition record stored in the apparatus.

53. The non-transitory computer readable medium as in claim 41, where the overlay function and the set of overlay parameters are stored in a smart card.

54. The non-transitory computer readable medium as in claim 41, where the overlay function is stored in a memory of the apparatus and the set of overlay parameters is stored in a smart card.

55. The non-transitory computer readable medium as in claim 41, wherein the overlay function comprises a configurable overlay function, wherein invoking the overlay function comprises invoking a current configuration of the configurable overlay function.

56. The non-transitory computer readable medium as in claim 55, wherein the set of overlay parameters comprises a current set of overlay parameters corresponding to the current configuration of the configurable overlay function.

57. The non-transitory computer readable medium as in claim 41, further comprising:
in response to determining that the set of overlay parameters specifies that a home network scan is to be performed, scanning for a home network; and
in response to detecting the home network, attempting to acquire the home network.

58. The non-transitory computer readable medium as in claim 57, wherein the set of overlay parameters comprises acquisition parameters for the home network.

59. The non-transitory computer readable medium as in claim 58, wherein the acquisition parameters comprise an indexed list of radio frequency channels to search.

60. The non-transitory computer readable medium as in claim 57, wherein initiating a scan to attempt to acquire the higher priority system is performed in response to one of a failed scan for the home network or failing to acquire the home network.

61. The non-transitory computer readable medium as in claim 60, said operations further comprising: in response to a successful attempt to acquire the higher priority system, determining if the set of overlay parameters specify that the apparatus is to perform a background scan for the home network and, if so, periodically scanning for the home network in an attempt to acquire the home network.

62. An apparatus comprising:
at least one means for communication;
means for storing information comprising an overlay function and a set of overlay parameters, wherein the set of overlay parameters comprises an indication of system priority among a plurality of different types of systems, wherein the indication of system priority does not include an indication of priority among different networks of a system, wherein the set of overlay parameters does not comprise a preferred roaming list or a public land mobile network list; and
processing means for performing system selection among the plurality of different types of systems by invoking the overlay function and, in response to determining that the set of overlay parameters specifies that a higher priority system is to be acquired, initiating a scan using the means for communication to attempt to acquire a network of the higher priority system, wherein priority among networks of the higher priority system is specified separately from the set of overlay parameters.

63. The apparatus as in claim 62, where invoking the overlay function occurs in response to at least one of power on of the apparatus and the apparatus roaming.

64. The apparatus as in claim 62, where the overlay function, when attempting to acquire the higher priority system, uses one of a preferred roaming list stored in the means for storing, a public land mobile network list stored in the means for storing or wireless local area network access information stored in the means for storing.

65. The apparatus as in claim 62, where the overlay function, when attempting to acquire the higher priority system, uses an acquisition record stored in the means for storing.

66. The apparatus as in claim 62, wherein the overlay function comprises a configurable overlay function that is configured with a current configuration, wherein invoking the overlay function comprises invoking the current configuration of the configurable overlay function, wherein initiating a scan further comprises utilizing the current configuration of the configurable overlay function.

67. The apparatus as in claim 66, wherein the means for storing is further for storing an alternate configuration and wherein the processing means is further for replacing the current configuration with the alternate configuration in response to a command received via said means for communication.

68. A non-transitory computer-readable medium storing a data structure readable by a data processor of an apparatus, said data structure comprising:
system priority information comprising an indication of system priority among a plurality of different types of systems, wherein the indication of system priority does not include an indication of priority among different networks of a system; and
configuration information comprising an indication of a status for at least one overlay mode,
wherein the data structure is for use by an overlay function configured to assist in performing system selection among the plurality of different types of systems, wherein the data structure is utilized by the overlay function to determine if the configuration information and the system priority information specify that a higher priority system is to be acquired and, if so, to initiate a scan to attempt to acquire a network of the higher priority system, wherein priority among networks of the higher priority system is specified separately from the data structure, wherein the data structure does not comprise a preferred roaming list or a public land mobile network list.

69. The non-transitory computer readable medium as in claim 68, where the configuration information further comprises an indication whether the overlay function is to rescan for the higher priority system in the event a lower priority system is acquired, and at least one rescan-related parameter.

70. The non-transitory computer readable medium as in claim 68, where the computer-readable medium comprises a memory storage medium that is removably attached to said apparatus.

71. The non-transitory computer readable medium as in claim 68, where at least one of the system priority information and the configuration information is revisable over-the-air.

72. The non-transitory computer readable medium as in claim 68, said data structure further comprising: performance information comprising at least one of an indication of a power measurement threshold level, an indication of a frequency for performing a background scan and at least one service-related parameter.

73. The non-transitory computer readable medium as in claim 68, wherein the system priority information further comprises information indicative of at least one home network.

74. The non-transitory computer readable medium as in claim 68, wherein the at least one overlay mode comprises at least one of a manual mode, an automatic with initial home selection mode, an automatic with initial selection of the higher priority system mode, a reselection for home system mode, a reselection for the higher priority system mode, a home network selection mode and a service based mode.

75. The non-transitory computer readable medium as in claim 68, said data structure further comprising a manual priority list comprising information indicative of a plurality of systems among which a user can manually select a system.

* * * * *